April 1, 1952     G. R. HOFFMASTER     2,591,154
METHOD OF MAKING A TEMPLE FOR OPHTHALMIC MOUNTINGS
Filed March 11, 1950

INVENTOR.
GEORGE R. HOFFMASTER
BY Donald M. Stewart
ATTORNEY.

Patented Apr. 1, 1952

2,591,154

UNITED STATES PATENT OFFICE 2,591,154

METHOD OF MAKING A TEMPLE FOR OPHTHALMIC MOUNTINGS

George R. Hoffmaster, Esterly, Pa., assignor to Willson Products, Inc., Reading, Pa., a corporation of Pennsylvania Application March 11, 1950, Serial No. 149,198

2 Claims. (Cl. 29—20)

The present invention relates to ophthalmic mountings, and more particularly, to a temple construction for such mountings and to the method of making the same for use on eyeglasses, sunglasses and the like.

In temples of well-known type, the forward end portions are generally of rigid construction and the rearward end portions are of somewhat flexible construction so that the latter may conform to the shape of the ears of the wearer without discomfort. A common method of manufacturing such temples comprises taking a solid piece of wire of greater diameter than that of the finished temple and whose length is in the neighborhood of ¼ to ⅓ the length of the temple and drawing out a substantial length of such wire to the finished size of the temple, leaving only a small undrawn end portion of the order of ¼ inch long. The purpose of the undrawn end portion is to provide sufficient metal to permit subsequent hammering or flattening of the end portion, trimming thereof and piercing with a hole to provide a pivotal connection for the forward end of the temple. A piece of flexible wire generally in the form of a cable, that is, one having a core with a spirally wound layer of wire on the surface thereof, is then attached to the extremity of the aforesaid drawn portion of the wire by spot soldering or welding to make the complete length of temple. The flexible rear end portions of said temples are then bent to conform to the shape of the ears.

The above described well-known method of making temples has the outstanding disadvantage of requiring a number of manufacturing operations which increases the cost of manufacture. A still further disadvantage is that since the ends of the cable and wire are joined together by spot soldering, there is a great tendency to provide a weak spot at the joint, making the temple greatly susceptible to breakage at the joint as a consequence of rough or sometimes ordinary handling of the eyeglasses.

An object of the present invention is to provide a novel temple and method of making the same, which temple is useful for eyeglasses, sunglasses and the like, and which is devoid of the above-named disadvantages of common types of temples and less expensive to manufacture as compared to well known methods of manufacture.

A more specific object of the present invention is to manufacture a temple from a single piece of cable-like wire by a method which is highly simplified and more economical than the aforesaid common method, and which results in a temple construction which is sturdy and has relatively long life.

Other objects and advantages of the present invention will be apparent from a study of the following description taken with the accompanying drawing wherein:

Fig. 6 is a perspective view of the finished temple hinged to an ear secured to a lens of a pair of eyeglasses, sunglasses or the like.

Figure 1:
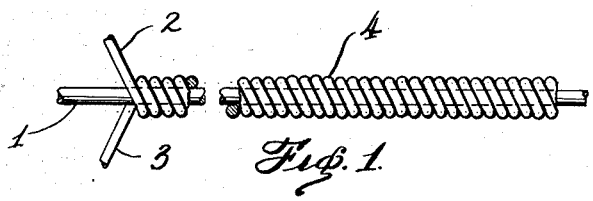
Fig. 1 is a plan view of a cable-like wire showing the end strands in partly unwound condition, and which wire is useful for making the entire length of temple in accordance with the principles of the present invention.

Referring more particularly to Fig. 1, numeral 1 denotes a core of wire of nickel-silver or any other suitable metal or alloy around which are spirally wrapped strands of wire 2 and 3 of nickel or other suitable metal or alloy. A suitable size for the diameter of core 1 is .04 inch and for the diameter of each of the wires 2 and 3 is .031 inch, although it should be understood that these dimensions are by way of example only and may be increased or decreased, as desired. The figures show two strands of wire 2 and 3 which are wrapped around core 1 by feeding them from diametrically opposite positions of the core in the manufacture thereof so as to form a double spiral layer or bifilar layer. However, it will be understood that either a single strand or perhaps triple or quadruple strands of wire may be used instead to form a single layered covering. Thus a cable is provided as shown in Fig. 1 of sufficient length to provide the entire length of temple.

Figure 2:
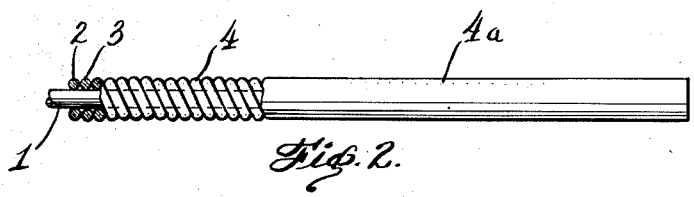
Fig. 2 shows the cable-like wire illustrated in Fig. 1 after the forward end portion has been dipped in silver solder or otherwise coated with metal.
Figure 3:
Fig. 3 shows the wire of Fig. 2 after most of the length thereof has been drawn to the diameter of the finished temple.

The next step in the process is to dip about 1½ inches of the forward end of the cable of Fig. 1 in silver solder or other metallic solder so as to provide a coating of metal that will fill the interstices of the covering wire and thus provide a solid cylindrical, relatively stiff end portion 4a as shown more clearly in Fig. 2. Of course, a greater or smaller length may be silver soldered, or other methods may be used to provide the smooth metallic coating for end portion 4a such as a brazing or an electrolytic method.

After the cable is in the form shown in Fig. 2, it is then drawn to a smaller diameter throughout most of its length by any suitable well-known means such as by a drawing die or by a process whereby intermittent hammering of the portion whose diameter is to be reduced is employed. Thus, the entire length of the cable, with the exception of portion 4b, is drawn down to a size corresponding to the finished diameter of the temple. In the above mentioned example, a suitable diameter for the drawn or finished temple is .069 inch, although this may be increased or decreased as desired. It will be noted that the parts of wires 2 and 3 on the portion 4a of the cable will be somewhat flattened as the result of the drawing process so as to approximate a smooth cylindrical surface.

Figure 4:
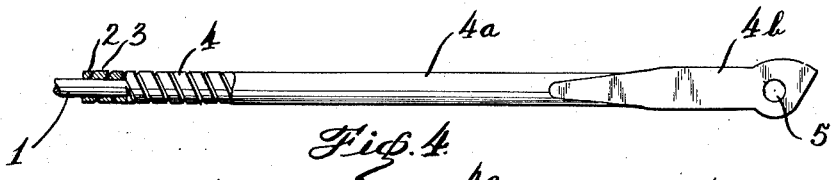
Fig. 4 shows the next step in the method applied to the wire shown in Fig. 3 whereby the undrawn end is flattened, trimmed and pierced.
Figure 5:
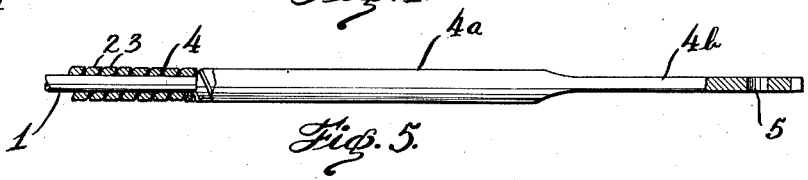
Fig. 5 is a view similar to Fig. 4 but taken in a direction at right angles thereto and showing the pierced or forward end portion of the temple in cross-section.

The small undrawn end portion 4b is then hammered or flattened, trimmed and pierced by hole 5 as shown in Fig. 4 by well-known methods. As will be more apparent in Figs. 4 and 5, the flattened end portion 4b is trimmed to such shape as to provide a stop member at the forward extremity of the temple for limiting the outward pivotal movement of the temple when pivotally mounted on the glasses as shown more clearly in Fig. 6.

Figure 6:
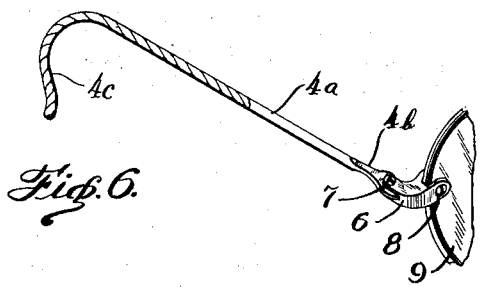

In Fig. 6, the temple is shown pivotally mounted to an ear or lug 6 extending from the side of a lens of a pair of spectacles or sunglasses. A screw 7 extending through hole 5 pivotally mounts the temple with respect to ear 6. Ear 6 is secured by means of screws 8 to a lens 9 in the case of a rimless eyeglass construction. It will be apparent that the temple may be pivotally mounted instead to a lens framing of the type wherein two adjoining ear portions extending from the side of each rim are fastened together. The temple is pivotally mounted therebetween in a well-known manner. The rearward end portion 4c of the flexible part of the temple is bent in the manner shown to conform to the shape of the ear of the wearer.

In its finished form, therefore, the forward end portion 4a of the temple is very rigid in construction by virtue of the metal coating thereon, whereas the rearward portion which terminates in a curved portion 4c is flexible and devoid of any joints which may weaken it since it is made from a single piece of cable instead of two pieces welded in end-to-end relationship as is common in the art.

Thus it will be seen that I have provided a novel temple for eyeglasses, sunglasses or the like, which is made from a single piece of cable and which may be manufactured by employing relatively few manufacturing steps thereby greatly simplifying manufacture and considerably reducing the cost of production thereof, and which results in a finished temple which is devoid of any weak spots and has relatively long life as compared with temples made by well-known manufacturing methods.

While I have illustrated and described a certain specific embodiment of my invention, it will be understood that this is by way of illustration only, and that various changes and modifications may be made within the contemplation of my invention and within the scope of the following claims.

I claim:

1. A method of making a temple for ophthalmic mountings from a single length of cable comprising a core having spirally wound therearound a layer of wire, said method comprising coating the forward end portion of said spirally wound wire with metal to provide a substantially smooth, solid cylindrical surface, then drawing both the coated and uncoated portions of said spirally wound wire throughout substantially the entire length of the cable with the exception of the extreme forward end portion of the coated portion, then flattening, trimming and piercing said extreme forward end portion of the cable, and finally bending the extremity of the uncoated and relatively flexible rear end portion so as to conform to the shape of the ear of the wearer.

2. The method of making a temple for eyeglasses and the like, which comprises spirally winding two strands of wire onto a metal wire core from diametrically opposite directions so as to provide a bifilar, spiralled covering of wire on the core, then dipping the forward portion of the resulting cable in silver solder to fill the interstices of said bifilar wire and so as to provide a smooth cylindrical surface, then drawing both the coated and uncoated portions of the cable to reduced diameter corresponding to the finished diameter of the temple, leaving a forward end portion of the dipped portion of the cable undrawn, shaping said undrawn end portion of the cable to provide a stop surface at the end thereof and piercing it with a hole to provide a pivotal connection with the eyeglasses and bending the extremity of the uncoated and relatively flexible portion of the cable to conform to the shape of the ear of the wearer.

GEORGE R. HOFFMASTER.

REFERENCES CITED

The following references are of record in the file of this patent:

UNITED STATES PATENTS

| Number | Name | Date |
|---|---|---|
| 827,817 | Peck | Aug. 7, 1906 |
| 931,776 | Laflin | Aug. 24, 1907 |
| 1,197,214 | Laflin | Sept. 5, 1919 |
| 1,605,474 | Schumacher et al. | Nov. 2, 1926 |
| 2,302,100 | Bosworth | Nov. 17, 1942 |

FOREIGN PATENTS

| Number | Country | Date |
|---|---|---|
| 8,868 | Great Britain | Apr. 14, 1909 |
| 265,013 | Great Britain | Feb. 3, 1927 |